(12) United States Patent
Kikuchi et al.

(10) Patent No.: US 6,828,931 B2
(45) Date of Patent: Dec. 7, 2004

(54) PROCESS FOR ADJUSTING THE DETECTING AXIS OF AN OBJECT DETECTOR

(75) Inventors: Hayato Kikuchi, Wako (JP); Kiichiro Sawamoto, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/366,690

(22) Filed: Feb. 14, 2003

(65) Prior Publication Data

US 2004/0003951 A1 Jan. 8, 2004

(30) Foreign Application Priority Data

Feb. 21, 2002 (JP) ...................................... 2002-044392

(51) Int. Cl.$^7$ ................................................. G01S 7/40
(52) U.S. Cl. ....................................................... 342/174
(58) Field of Search ................................ 342/165, 173, 342/174

(56) References Cited

U.S. PATENT DOCUMENTS

| | | | | |
|---|---|---|---|---|
| 5,264,855 | A | * 11/1993 | Lammers et al. | ........... 342/165 |
| 2004/0003951 | A1 | * 1/2004 | Kikuchi et al. | ............. 180/169 |

FOREIGN PATENT DOCUMENTS

| | | | |
|---|---|---|---|
| JP | 9-178856 | 11/1997 | |
| JP | 11-204985 | 7/1999 | |
| JP | 11-38140 | 12/1999 | |
| JP | 2001 174540 | 6/2001 | |
| JP | 2001 223492 | 8/2001 | |
| JP | 2003-240837 | * 8/2003 | ........... G01S/13/93 |

OTHER PUBLICATIONS

Patent Abstracts of Japan; Pub. No. 2001–174540, published Jun. 29, 2001; English Abstract.

Patent Abstracts of Japan; Pub. No. 11–204985, published Jul. 30, 1999; English Abstract.

Patent Abstracts of Japan; Pub. No. 2001–223492, published Aug. 17, 2001; English Abstract.

* cited by examiner

Primary Examiner—Daniel Pihulic
(74) Attorney, Agent, or Firm—Arent Fox PLLC

(57) ABSTRACT

An object detecting device mounted on a vehicle transmits an electromagnetic wave to a detecting area established in a traveling direction of the vehicle. The object detecting device receives a wave resulting from the reflection of the electromagnetic wave from an object in the detecting area, thereby detecting the object. A reference reflector is disposed at a predetermined location in front of the object detecting device. A plurality of tires are stacked on top of one another behind the reference reflector to form an electromagnetic wave absorber. An object detecting axis of the object detecting device is adjusted by transmitting the electromagnetic wave so that the reference reflector assumes a reference position of the detecting area.

19 Claims, 16 Drawing Sheets

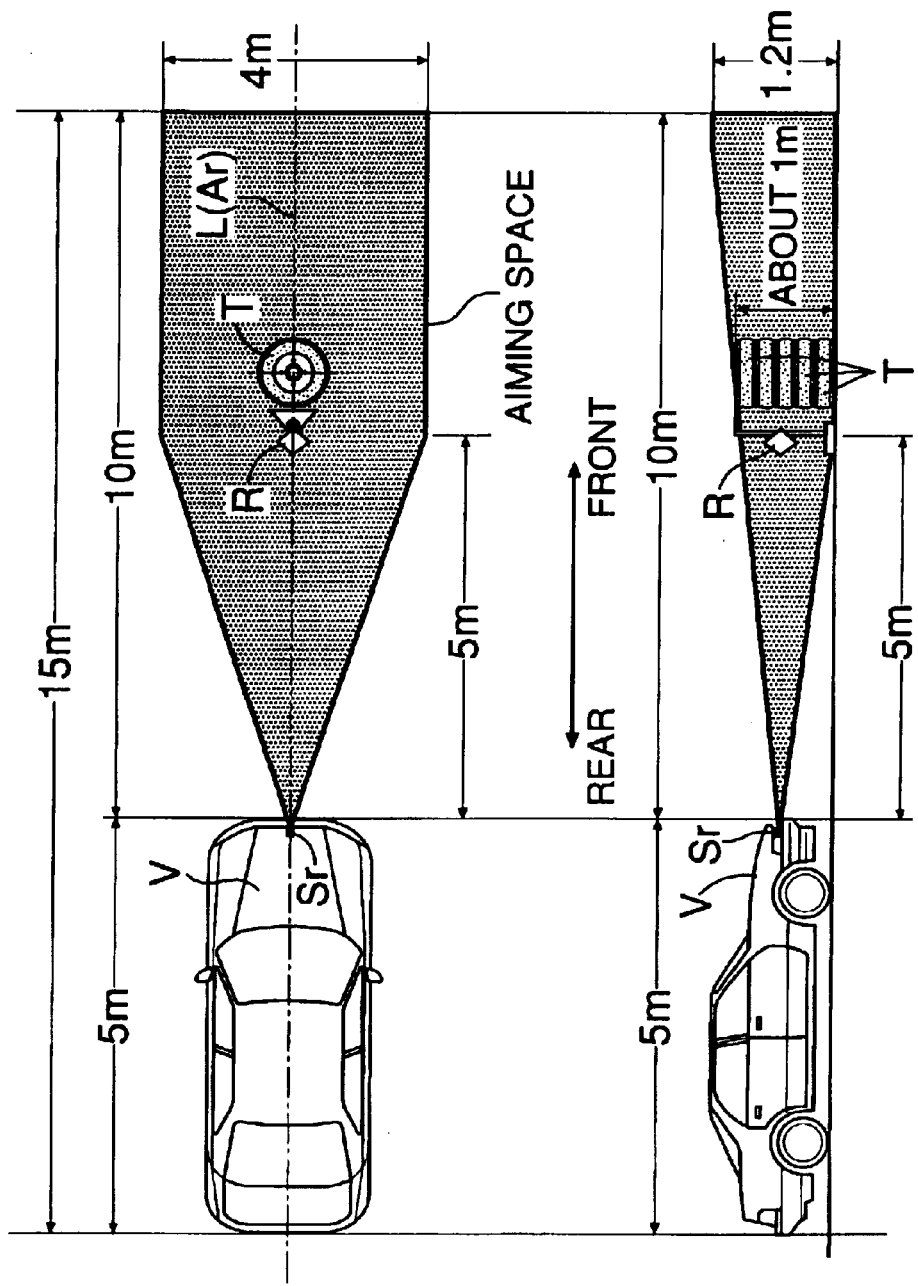

(USUAL OBJECT)

(ELECTROMAGNETIC WAVE ABSORBER)

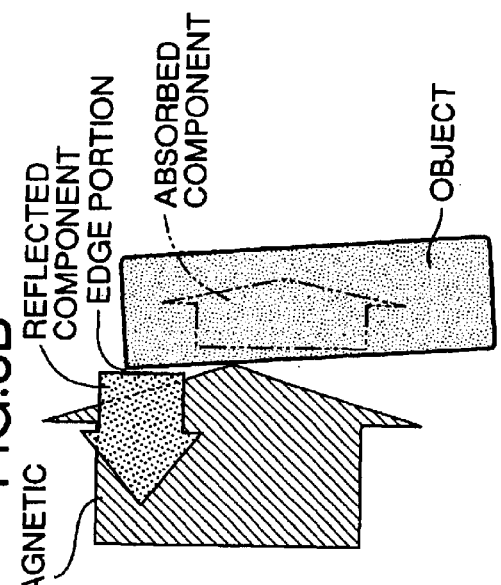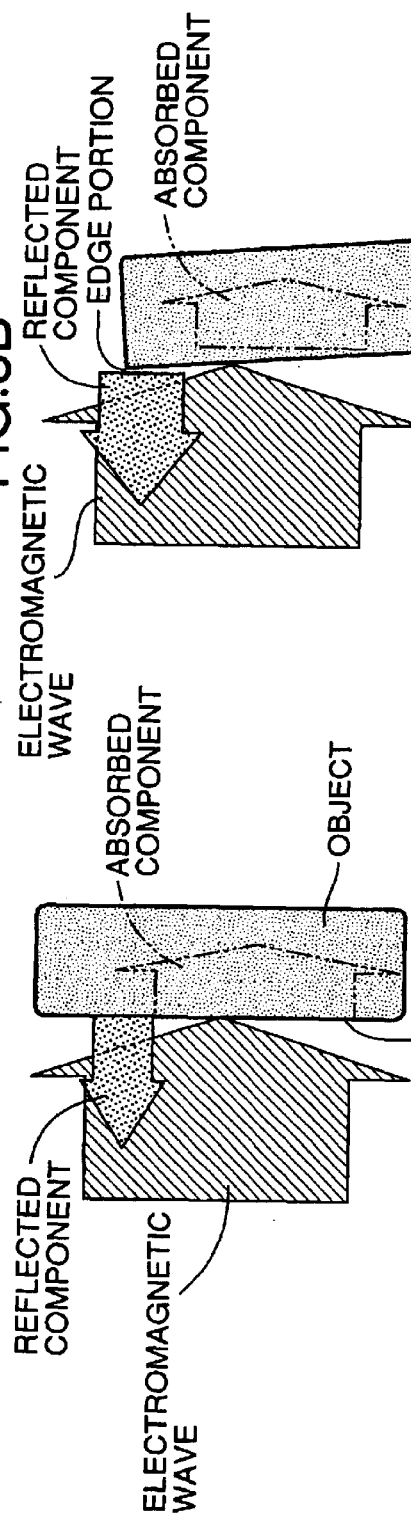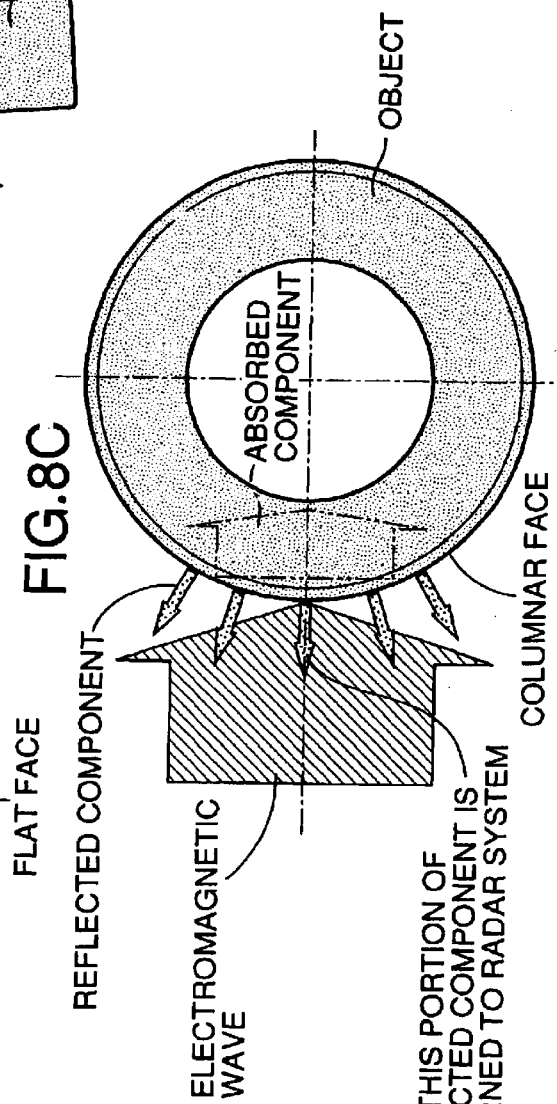

PROCESS FOR ADJUSTING THE DETECTING AXIS OF AN OBJECT DETECTOR

BACKGROUND OF THE INVENTION

1. Field of the Invention

The present invention relates to a process for adjusting the detecting axis of an object detector that detects an object in a predetermined detecting area provided in a traveling direction of a vehicle by transmitting an electromagnetic wave to the detecting area and receiving a wave reflected from the object.

2. Description of the Related Art

When a radar system used in an adaptive cruise control system (ACC system), a traffic snarl follow-up system (Stop & Go system), an inter-vehicle distance warning system and other such systems are mounted to a vehicle, if an object detecting axis of the radar system is not correctly oriented to a preset direction, several problems may occur. For example, an on-coming vehicle in an adjacent lane may be erroneously detected, wherein the system is incorrectly operated. Additionally, the system may only detect a road surface, a bridge or a signboard. Moreover, the system may not detect a vehicle traveling ahead of a subject vehicle (a preceding vehicle), wherein the system is not operating.

A system that conducts an aiming operation for aligning an object detecting axis of a radar system with a preset direction is disclosed in Japanese Patent Application Laid-open Nos. 9-178856 and 11-38140. The disclosed system is designed to aim the object detecting axis of the radar system by stopping a vehicle to assume a predetermined positional relationship to a reference reflector; receive a reflected wave resulting from an electromagnetic wave transmitted from the radar system reflecting off of a reference reflector; detect the direction of the object detecting axis of the radar system from the detected direction of the reference reflector; and then align the direction with a preset direction.

In the conventional aiming process, a reference reflector R is positioned on the centerline L of a vehicle and 5 m forward of a front end of a vehicle V, as shown in FIG. 13A. However, the conventional aiming process requires no object, other than the reference reflector R, to be located in an aiming space that spans an area approximately 15 m from the front end of the vehicle and laterally 2 m from the centerline L of the vehicle. Therefore, a large space having a length of about 20 m and a width of 4 m, including the area covered by the vehicle V, is required, as shown in FIG. 13B.

If an object other than the reference reflector R exists in a detecting area for the radar system Sr, the radar system Sr detects both the reference reflector R and the object, as shown in FIG. 14A. As a result, the radar system Sr and the object cannot differentiate between the reference reflector R and the object, as shown in FIG. 14B. Therefore, there is a possibility that the object may be misidentified as the reference reflector R upon which to base the aiming process, resulting in the object detecting axis Ar of the radar system Sr being erroneously positioned.

If another object exists close to the reference reflector R and within the detecting area for the radar system Sr, as shown in FIG. 15A, the radar system Sr detects the reference reflector R and the object as a single object, as shown in FIG. 15B. Therefore, there is a possibility that the central position of the detected object may be misrecognized as the position of the reference reflector R upon which to base the aiming process, resulting in the object detecting axis Ar of the radar system Sr being erroneously positioned.

When a wall reflecting an electromagnetic wave is ahead of and relatively near the reference reflector R because an aiming space having a sufficient length cannot be located, as shown in FIG. 16, a wave reflected from the reference reflector R and a wave reflected from the wall merge, resulting in the position of the reference reflector-R not being recognized such that the aiming process cannot be performed.

SUMMARY OF THE INVENTION

Accordingly, it is an object of the present invention to overcome the above-described drawbacks of the related art.

Additionally, it is an object of the present invention to ensure that even when an aiming space having a sufficient length cannot be located, an accurate aiming process can be executed.

To achieve the above objects, according to a first aspect and feature of the present invention, there is provided a process for adjusting a detecting axis of an object detecting means for detecting an object present in a predetermined detecting area established in a traveling direction of a vehicle. An electromagnetic wave is transmitted to the detecting area and then receives a wave that is reflected from the object. The process includes a disposing step wherein a reference reflector is disposed at a predetermined location in front of an object detecting means that is mounted on a vehicle and disposing an electromagnetic wave absorber ahead of and in proximity of the reference reflector. The electromagnetic wave absorber has an extent that includes the entire projected image of the reference reflector. Additionally, there is an adjusting step wherein an object detecting axis of the object detecting means is adjusted so that the reference reflector assumes a reference position for the detecting area.

With this arrangement, in a state in which the electromagnetic wave absorber is disposed ahead of and in proximity of the reference reflector, which itself is disposed in front of the object detecting means mounted on the vehicle, the electromagnetic wave is transmitted from the object detecting means to adjust the object detecting axis of the object detecting means so that the reference reflector assumes the reference position for the detecting area. Therefore, it is not required that an aiming space, where no object reflecting the electromagnetic wave exists, be widely secured ahead of the reference reflector. Further, even when an aiming space having a sufficient length cannot be secured, an accurate aiming process can be executed.

According to a second feature of the present invention, a face of the electromagnetic wave absorber positioned on the side of the object detecting means is columnar. With this arrangement, the reflection of the electromagnetic wave from the electromagnetic wave absorber is minimized while the electromagnetic wave absorber reliably obtains the projected image of the reference reflector.

According to third and fourth features of the present invention, the electromagnetic wave absorber has a height ranging over a vertical width of the detecting area in a position where the electromagnetic wave absorber is disposed. With this arrangement, the electromagnetic wave absorber has the height ranging over the vertical width of the detecting area for the object detecting means. As a result, the electromagnetic wave is reliably prevented from being reflected off an object other than the reference reflector.

According to fifth to eighth features of the present invention, the electromagnetic wave absorber is black. With this arrangement, the electromagnetic wave absorber more effectively absorbs near infrared rays, which are waves transmitted by a laser radar system.

According to ninth and tenth features of the present invention, the electromagnetic wave absorber comprises a tire. With this arrangement, the electromagnetic wave absorber has a black color and effectively absorbs near infrared rays. Furthermore, the electromagnetic wave absorber also has an enhanced absorbability for a millimeter wave of a millimeter radar device since carbon black is contained in the tire. Additionally, the electromagnetic wave absorber can be constructed to have any height by stacking a plurality of the tires on top of each other. Moreover, the electromagnetic wave-reflecting face is the columnar face, thus, the reflection of the electromagnetic wave is minimized.

A radar system Sr in each of embodiments corresponds to the object detecting means of the present invention, and tires T in each of the embodiments correspond to the electromagnetic wave absorber of the present invention.

The above and other objects, features and advantages of the invention will become apparent from the following description of the preferred embodiment taken in conjunction with the accompanying drawings.

BRIEF DESCRIPTION OF THE DRAWINGS

FIG. 6A is a plan view of a diagram showing a position of an aiming space;

FIG. 6B is a side view of FIG. 6A;

FIGS. 8A to 8C are diagrams showing variations in sizes of a reflected component, an absorbed component, and a transmitted component of an electromagnetic wave;

DESCRIPTION OF THE PREFERRED EMBODIMENTS

A first embodiment of the present invention will now be described with reference to FIGS. 1 to 8C.

Figure 1:
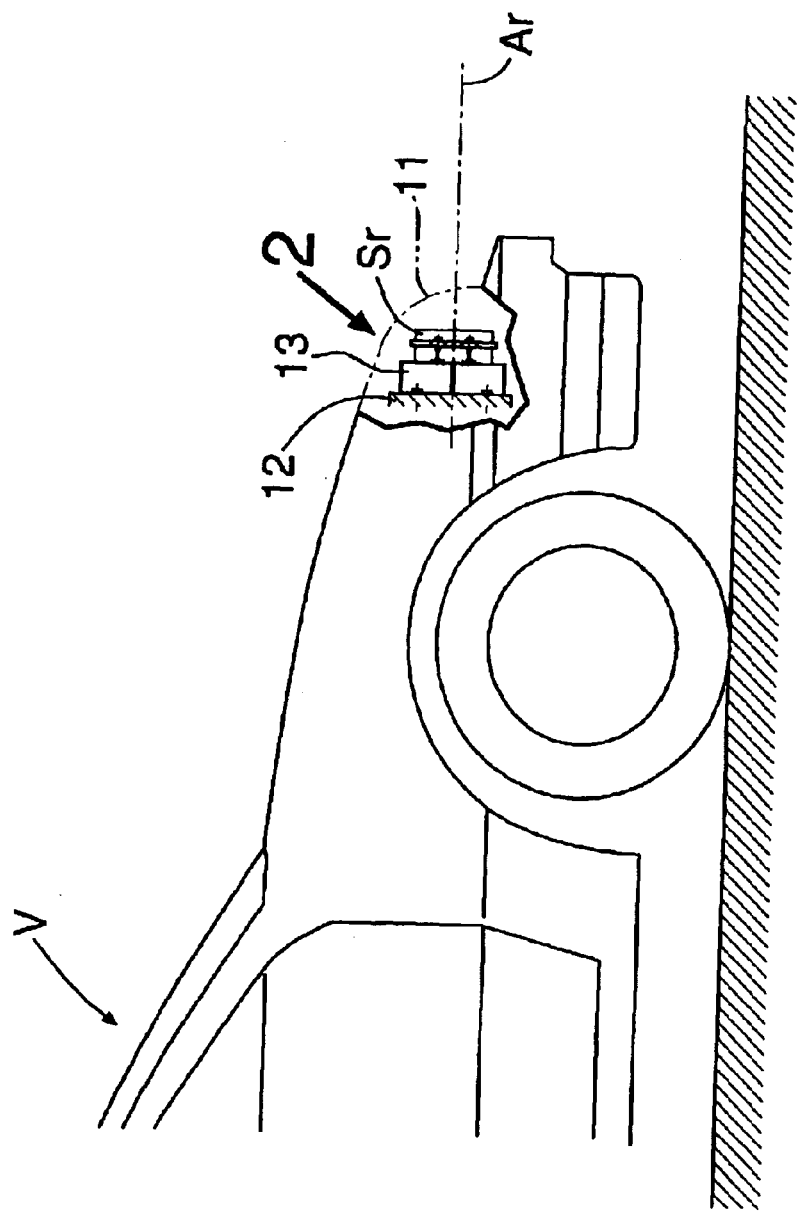
FIG. 1 is a side view of a front portion of a vehicle provided with a radar system.
Figure 2:
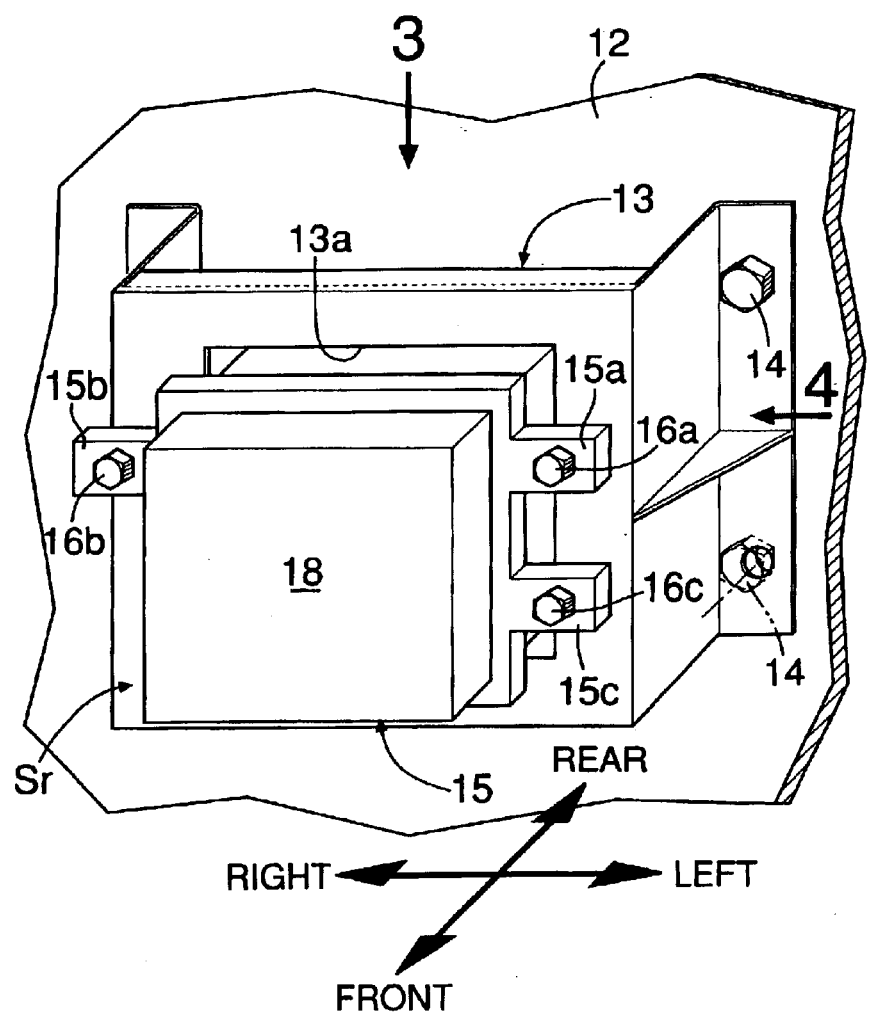
FIG. 2 is a perspective view of the casing and bracket mounted to the vehicle body shown by the arrow 2 in FIG. 1.
Figure 3:
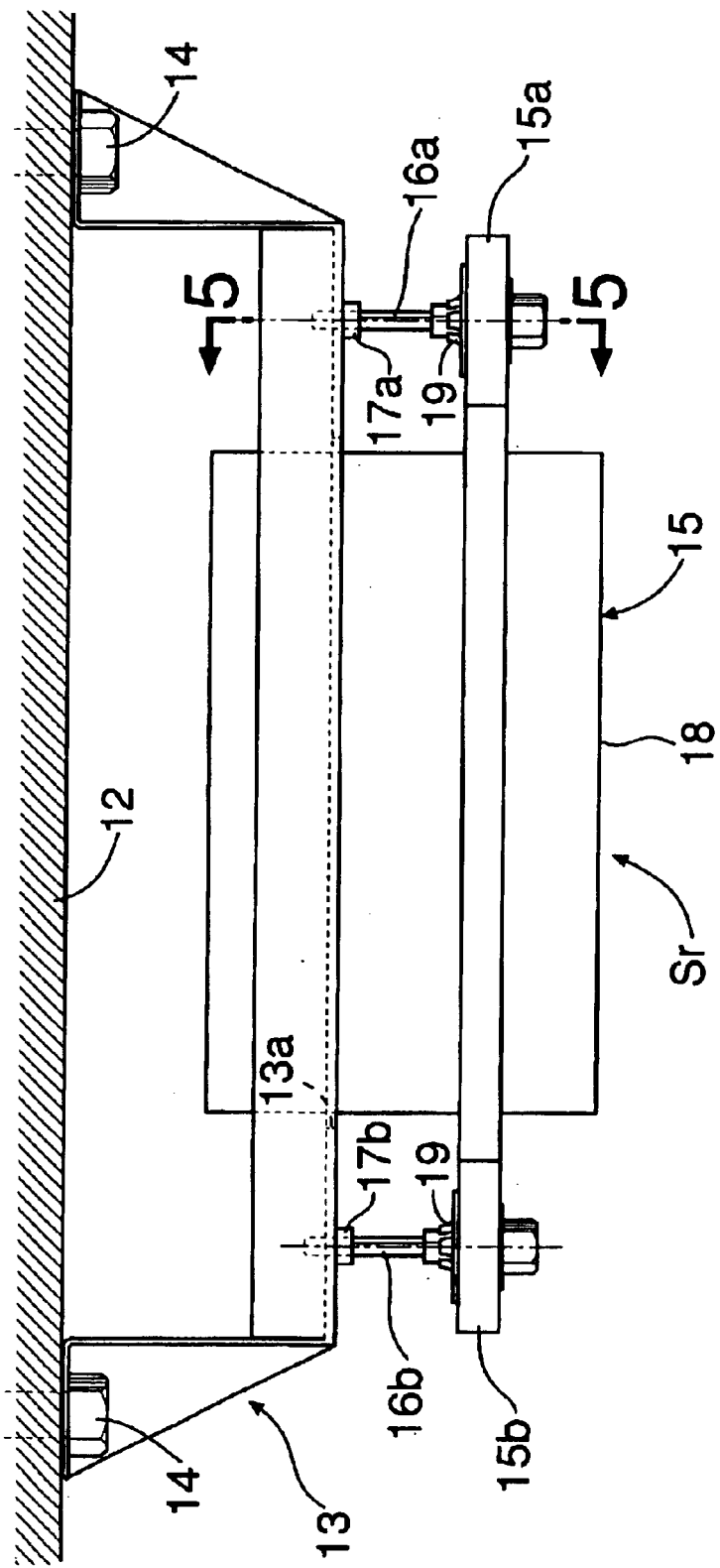
FIG. 3 is a plan view of the casing and bracket mounted to the vehicle body shown by the arrow 3 in FIG. 2.
Figure 4:
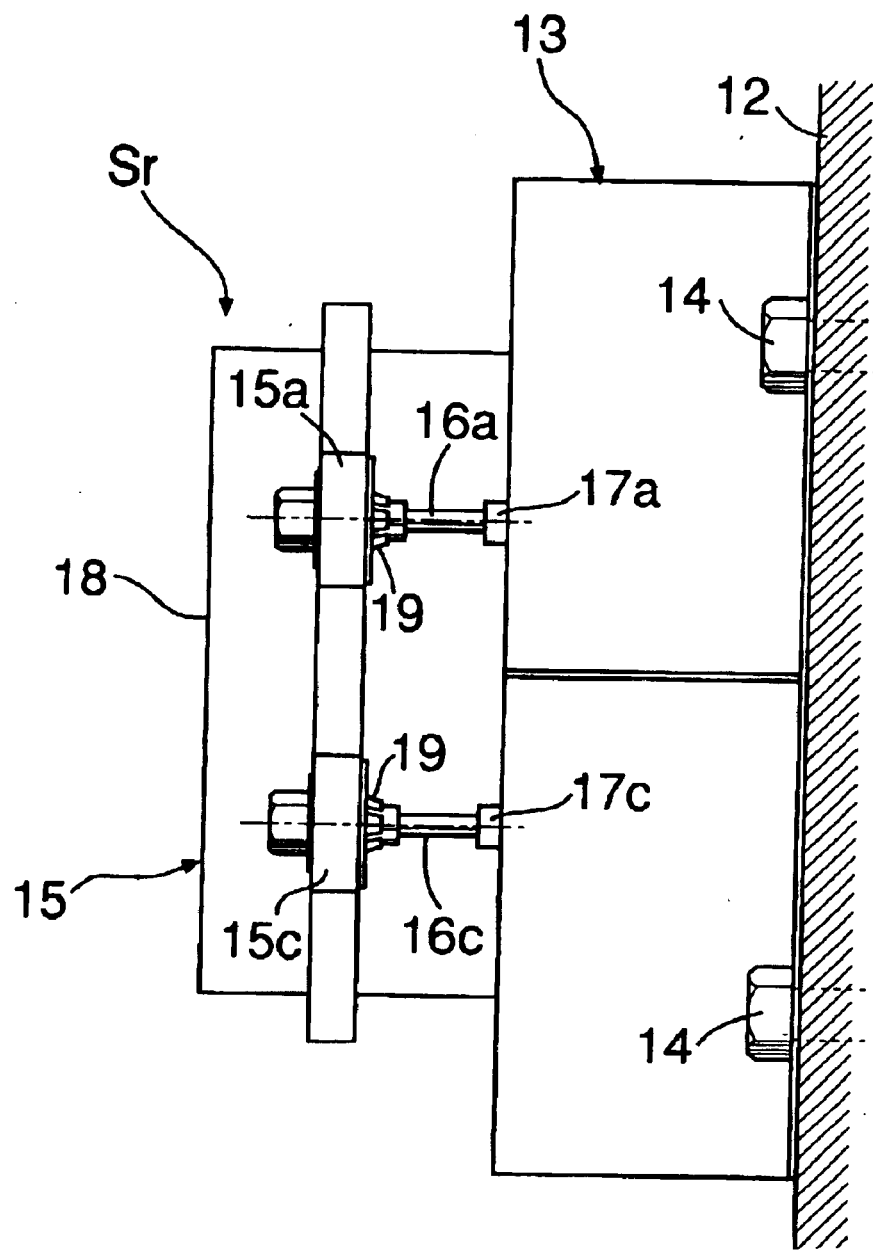
FIG. 4 is a side view of the casing and bracket mounted to the vehicle body shown by the arrow 4 in FIG. 2.
Figure 5:
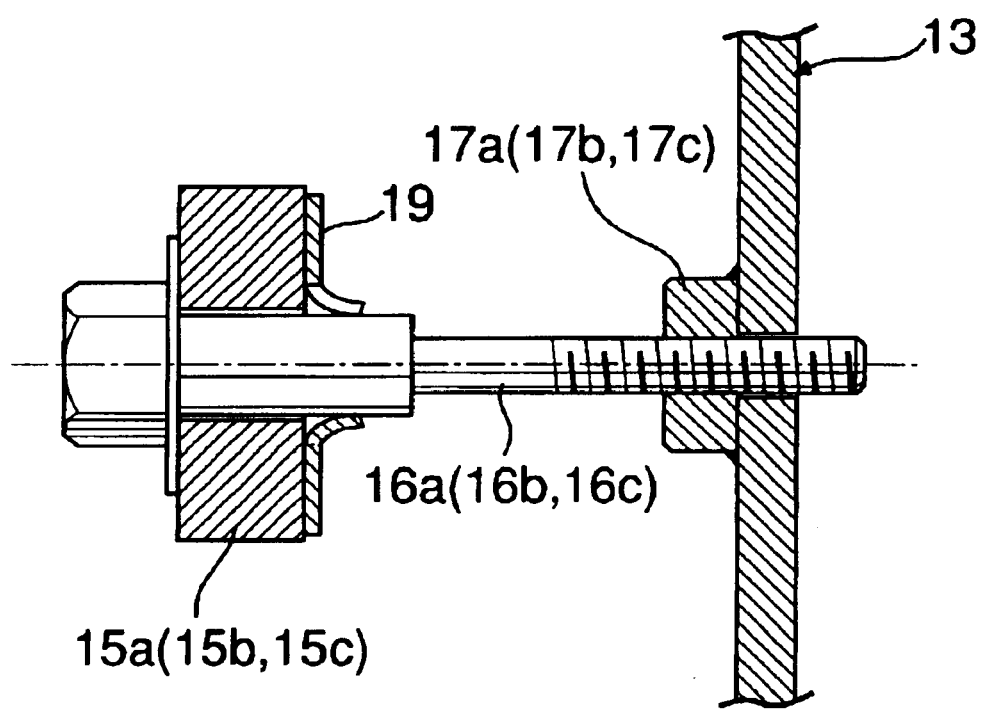
FIG. 5 is a sectional view taken along line 5—5 in FIG. 3.

As shown in FIG. 1, a radar system Sr for detecting an object, such as, for example only, a vehicle (hereinafter referred to as a preceding vehicle), traveling ahead of a vehicle V relative to a traveling direction of the vehicle V, is disposed inside a front grill 11 and supported on a bracket 13 mounted to a vehicle body 12. The terms "front", "rear", "left", and "right" are relative to an occupant sitting on a seat in the vehicle and illustrated in FIG. 2.

As can be seen from FIGS. 2 to 5, the bracket 13 is formed from a metal plate folded into an angular U-shape in section as viewed in a plane. The bracket 13 is fixed at four corners to the vehicle body 12 by four bolts 14. The radar system Sr includes a rectangular parallelepiped casing 15 having three stays 15a, 15b and 15c integrally provided therein and projecting from an outer peripheral surface. The stays 15a, 15b and 15c are fixed to welded nuts 17a, 17b and 17c of the bracket 13 by adjusting bolts 16a, 16b and 16c. In this state, a rear portion of the casing 15 is fitted into an opening 13a defined in a front surface of the bracket 13. The adjusting bolts 16a, 16b and 16c are inserted from the front of the bracket 13 and into bolt bores in the stays 15a, 15b and 15c with portions near their heads fitted into bolts bores. In this state, the bolts 16a, 16b and 16c are engaged via push nuts 19 with the rear surfaces of corresponding stays 15a, 15b and 15c. As a result, the bolts 16a, 16b and 16c are prevented from slipping out while being rotated.

Two of the adjusting bolts 16a and 16b are disposed at left and right upper portions of the front surface 18 of the casing 15, and the remaining adjusting bolt 16c is disposed below the left upper adjusting bolt 16a, that is, at a left lower portion of the front surface 18 of the casing 15.

As shown in FIG. 6A, the vehicle having the radar system Sr mounted thereon is stopped to face an aiming space having a length of 10 m and a width of 4 m. A reference reflector R is placed 5 m from a front end of the vehicle V on a centerline L of the vehicle V. The reference reflector R is mounted to a pedestal disposed either outside a detection area or at a portion as low as possible within the detection area. A support post of the pedestal is made of a material permeable to an electromagnetic wave, such as a resin. The height of the reference reflector R from a floor surface is set at 0.5 to 0.6 m, which is substantially equal to the height of the radar system Sr. The reference reflector R may be of any structure so long as the structure reflects the electromagnetic wave. The reference reflector R in this embodiment is of a structure in which three flat surfaces, each having an electromagnetic wave-reflecting metal foil adhered thereto, are disposed so that they are perpendicular to one another.

As shown in FIG. 6B, a plurality of tires T, which function as an electromagnetic wave absorber, are stacked on top of one another and positioned such that the reference reflector R is between the tires T and the vehicle V. The height of the detection area for the radar system Sr is about 0.9 m at a location corresponding to the reference reflector R. Thus, five tires T are stacked on top of one another up to a height of about 1 m so as to exceed the height of the detection area. The electromagnetic wave absorber, comprising the plurality of tires T stacked on top of one another, is disposed to cover the entire region of a projected area of the reference reflector R as viewed from the radar system Sr.

In this state, the electromagnetic wave is transmitted from the radar system Sr, and a wave resulting from the electromagnetic wave reflecting off of the reference reflector R is received, and the position of the reference reflector R is detected. If the lateral position of the reference reflector R is detected on the centerline L of the vehicle, it follows that an object detecting axis of the radar system Sr has been aimed accurately in a lateral direction. In the vertical aiming of the object detecting axis Ar, a level may be placed on an upper surface of the casing 15, and the object detecting axis Ar aligned relative to a horizontal direction. If the object detecting axis Ar is misaligned in a lateral or vertical direction, the object detecting axis Ar is adjusted as explained below.

If the right upper adjusting bolt 16b is screwed further into the welded nut 17b without operating the left upper adjusting bolt 16a and the left lower adjusting bolt 16c, which are references, the right side of the radar system Sr is moved in a direction toward the bracket 13 such that the object detecting axis Ar of the radar system Sr is adjusted rightward. On the other hand, if the right upper adjusting bolt 16b is loosened in the welded nut 17b, the right side of the radar system Sr is moved in a direction away from the bracket 13 such that the object detecting axis Ar of the radar system Sr is adjusted leftward.

If the left lower adjusting bolt 16c is screwed further into the welded nut 17c without operating the left upper adjusting bolt 16a and the right upper adjusting bolt 16b, the lower side of the radar system Sr is moved toward the bracket 13 such that the object detecting axis Ar of the radar system Sr is adjusted to downward. On the other hand, if the left lower adjusting bolt 16c is loosened in the welded nut 17c, the lower side of the radar system Sr is moved away from the bracket 13 such that the object detecting axis Ar of the radar system Sr is adjusted upward.

Figures 14A, 14B:
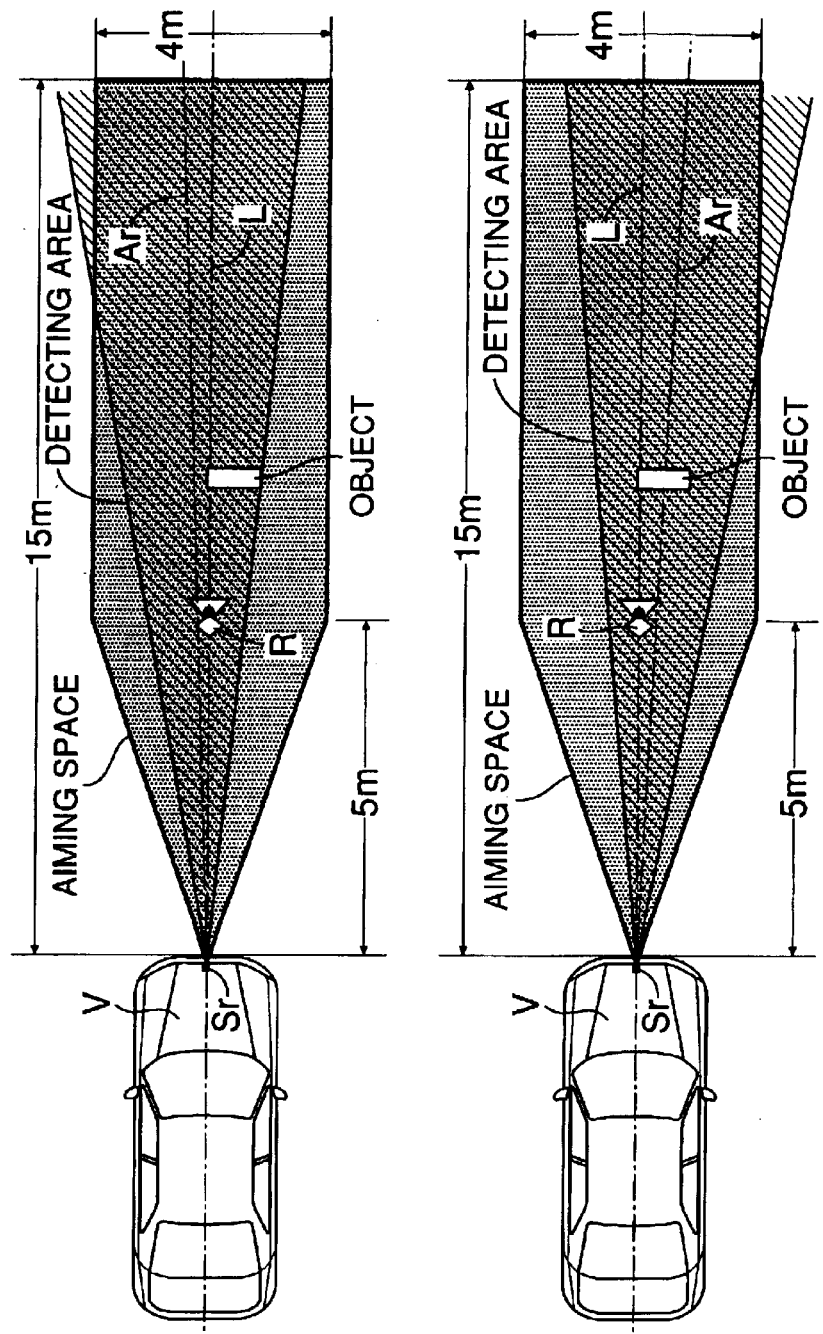
FIG. 14A is a plan view of a diagram showing a state in which a reference reflector and an object are detected separately.
FIG. 14B is a plan view of a diagram showing a state in which a reference reflector and an object are detected separately.
Figures 15A, 15B:
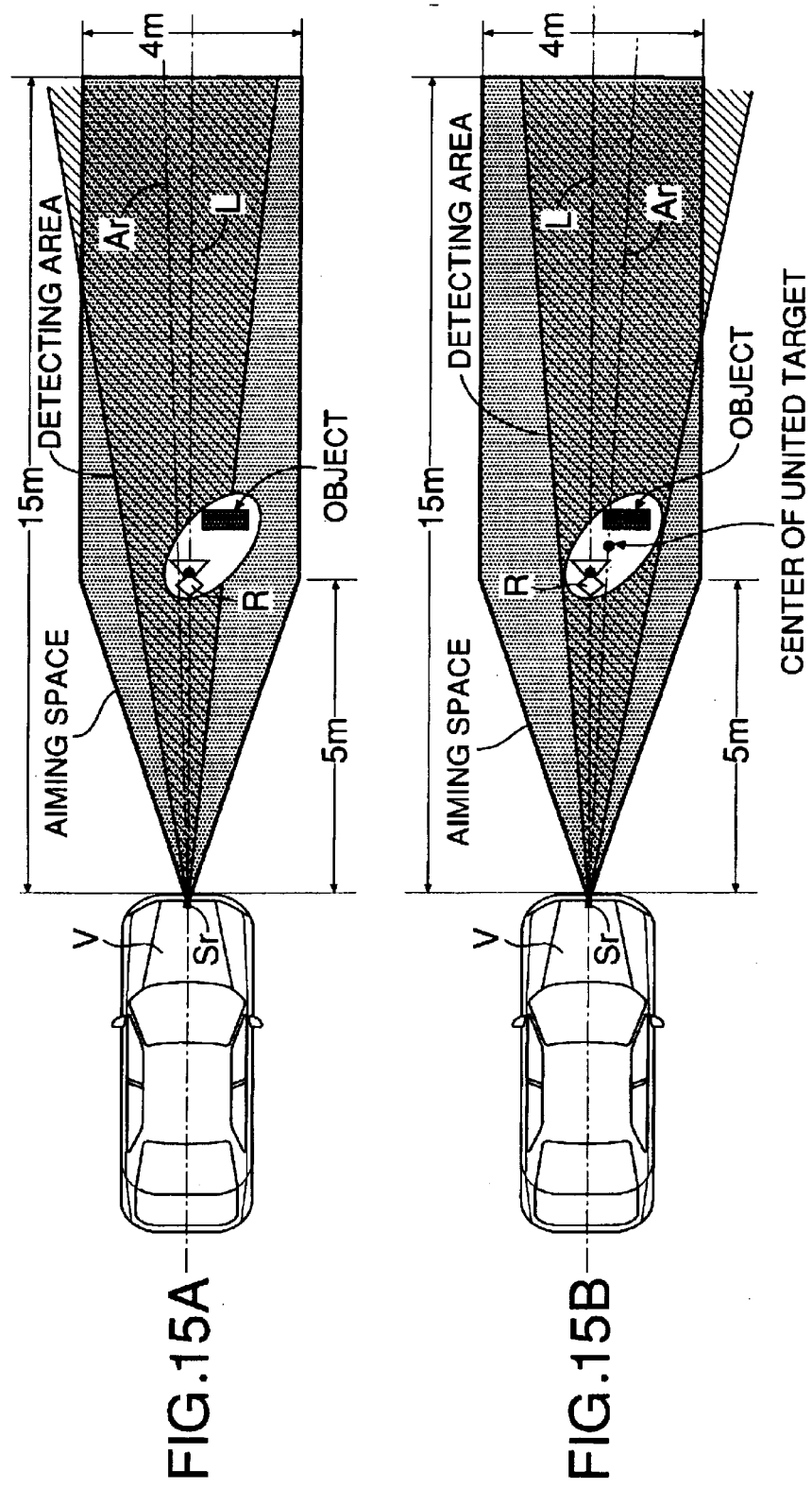
FIG. 15A is a plan view of a diagram showing a state in which a reference reflector and an object are detected as one object.
FIG. 15B is a plan view of a diagram showing a state in which a reference reflector and an object are detected as one object.
Figure 16:
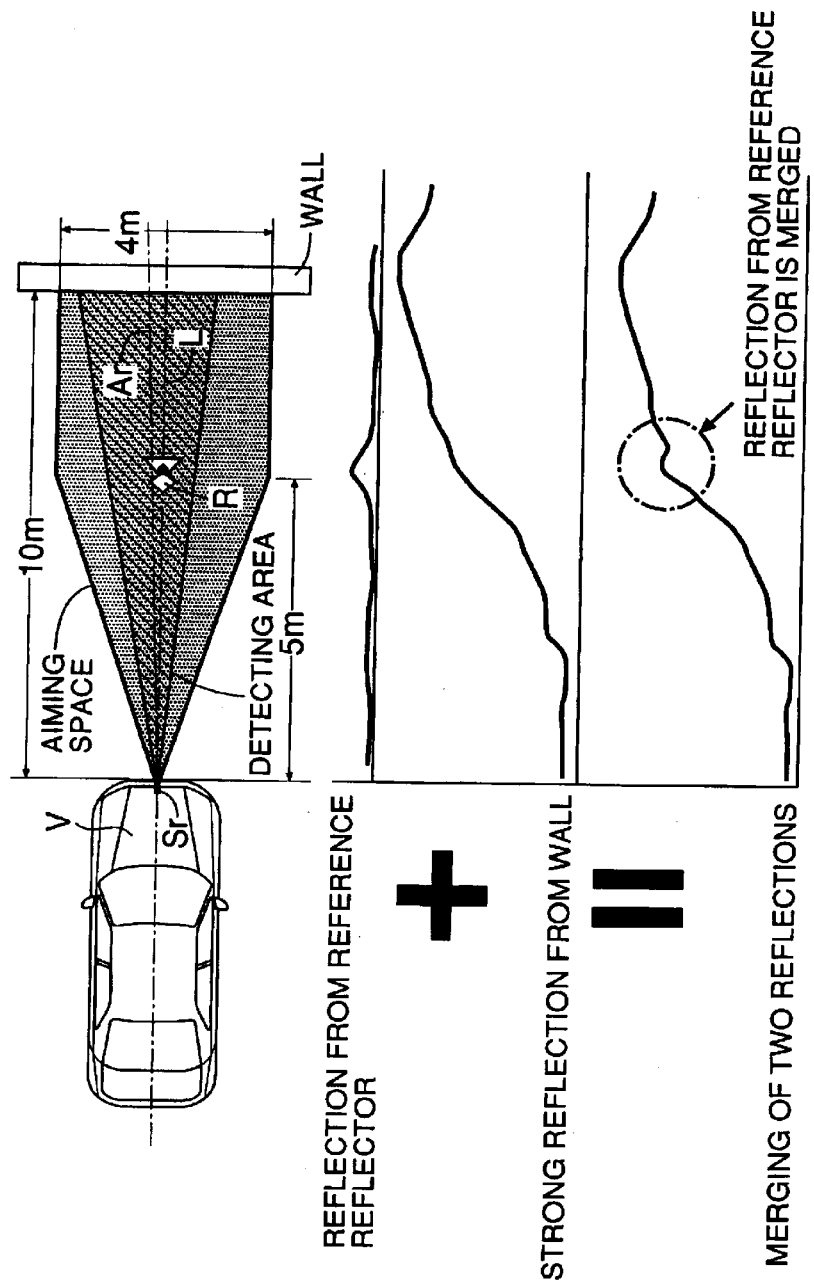
FIG. 16 is a diagram showing a state in which a wall exists ahead of and in proximity to a reference reflector.

If the electromagnetic wave transmitted from the radar system Sr is reflected and the thus-reflected wave is received in the process of the aiming of the object detecting axis Ar of the radar system Sr as described above, the drawbacks affiliated with the above-provided description of FIGS. 14, 15 and 16 occur, so that the accuracy of the aiming is deteriorated, or aiming cannot be achieved. According to the present embodiment, however, the length of the entire space required for the aiming can be 15 m which is shorter than the 20 m required in the conventional aiming process. Thus, the present embodiment is able to easily secure an aiming space where no object other than the reference reflector R exists. Moreover, by using tires T as an electromagnetic wave absorber to absorb the electromagnetic wave, the influence of a wave reflected from a front wall of the reference reflector R is reduced, and the proportion of a wave reflected from the tires T themselves is reduced, thereby enabling an accurate aiming. The reason for this result is described below.

Figure 7A:
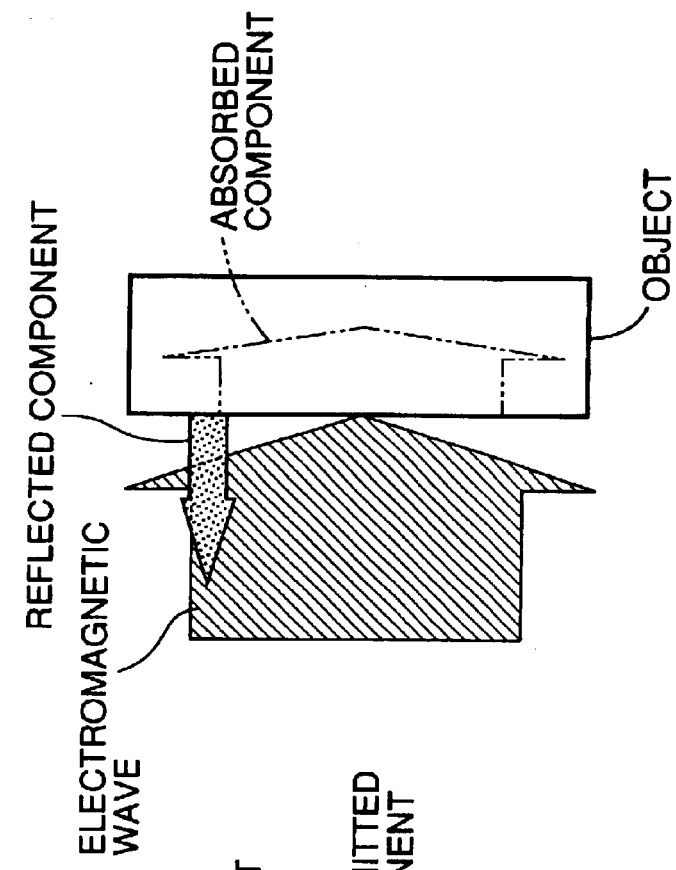
FIGS. 7A and 7B are diagrams showing variations in sizes of a reflected component, an absorbed component, and a transmitted component of an electromagnetic wave.
Figure 7B:
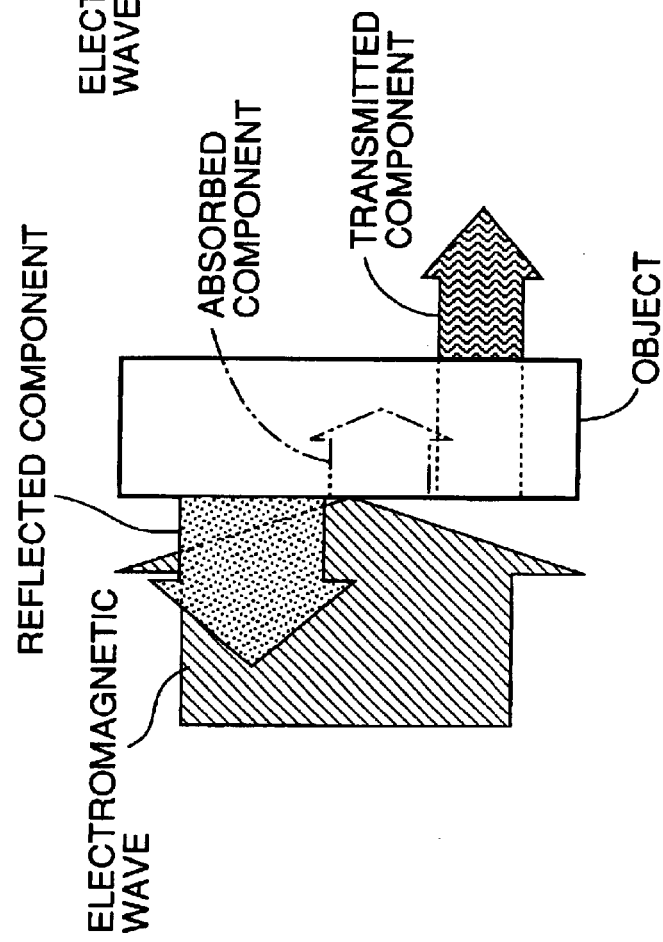

Upon hitting the object, the electromagnetic wave is divided into a reflected component, an absorbed component, and a transmitted component, as shown in FIG. 7A. If the object has a sufficient thickness, the proportion of the transmitted component can be reduced to zero, but the proportions of both the reflected component and the absorbed component cannot be reduced to zero. If the object is capable of absorbing an electromagnetic or millimeter wave and has a sufficient thickness, as shown in FIG. 7B, the proportion of the transmitted component can be reduced to zero. Moreover, the proportion of the reflected component can be substantially reduced. Among materials that can absorb the electromagnetic wave, carbon black is inexpensive and easily available. It is possible to provide an increase in strength, an increase in black chromaticity, an enhancement in conductivity and an enhancement in millimeter wave absorbability by incorporating carbon black into a material such as a rubber, a resin, a coating, an ink and the like.

To enhance the millimeter wave absorbability, it is conceivable to apply a coating or an ink containing carbon black to a surface of the electromagnetic wave absorber, but there is a limit to the effective thickness of the coating film. Therefore, it is desirable that the electromagnetic wave absorber itself be formed of a rubber or a resin containing carbon black. Carbon black is contained in a content of about 26% in the tire T for the vehicle to have a high millimeter wave absorbability, but also a ground-contact surface of the tire T has a thickness equal to or larger than 10 mm. Thus, the transmitted component is almost zero. Moreover, rubber itself has a nature of absorbing a millimeter wave, and therefore is an ideal material from which the electromagnetic wave absorber may be formed.

Even when an object is an electromagnetic wave absorber, the proportion of the reflected component varies depending on the shape of the object. If a reflecting face of an object is flat, the reflected component is enlarged, as shown in FIG. 8A. Also, the reflected component is enlarged at an edge of the object, as shown in FIG. 8B. On the other hand, an object, such as a tire T, has an electromagnetic wave-reflecting face which is columnar and has no edge. Thus, the proportion of the reflected component can be effectively reduced.

By placing the stacked tires T behind and in proximity to the reference reflector R such that the reference reflector R is between the radar system Sr and tires T, as described above, the electromagnetic wave transmitted from the radar system Sr can be prevented from penetrating the tire T, and a wave reflected from a front face of the tire can be prevented from being received by the radar system Sr. Thus, only the reference reflector R is accurately detected. Although the tire T has a columnar reflecting face, only the electromagnetic wave directed to the central axis of the tire is reflected toward the radar system Sr. However, by disposing the tire T so that its central axis is superposed on the reference reflector R when viewed from the radar system Sr, as shown in FIG. 6, a wave reflected from the tire T can be superposed on a wave reflected from the reference reflector R to eliminate an adverse effect.

If the electromagnetic wave absorber is formed into a spherical shape, only the electromagnetic wave reflected at one point from the surface of the electromagnetic wave absorber is received by the radar system Sr, and hence the influence of the reflected wave is minimized. However, there is a situation in that the electromagnetic wave absorber is difficult to be stably placed because it is liable to roll, and spaces are created on the left and right sides above and below the center of the electromagnetic wave absorber. Accordingly, the electromagnetic wave is easy to pass through the electromagnetic wave absorber. On the other hand, with a columnar electromagnetic wave absorber comprising tires T stacked on top of one another, only the electromagnetic wave reflected from a line on the surface of the absorber is received by the radar system Sr. Thus, the influence of the reflected wave is sufficiently reduced. Moreover, the columnar electromagnetic wave absorber can be placed in a stable state in which it is difficult to roll, but also a wide region, as compared with the spherical electromagnetic wave absorber, can be reliably covered to suppress the passing-through of the electromagnetic wave to the minimum.

Figures 9A, 9B:
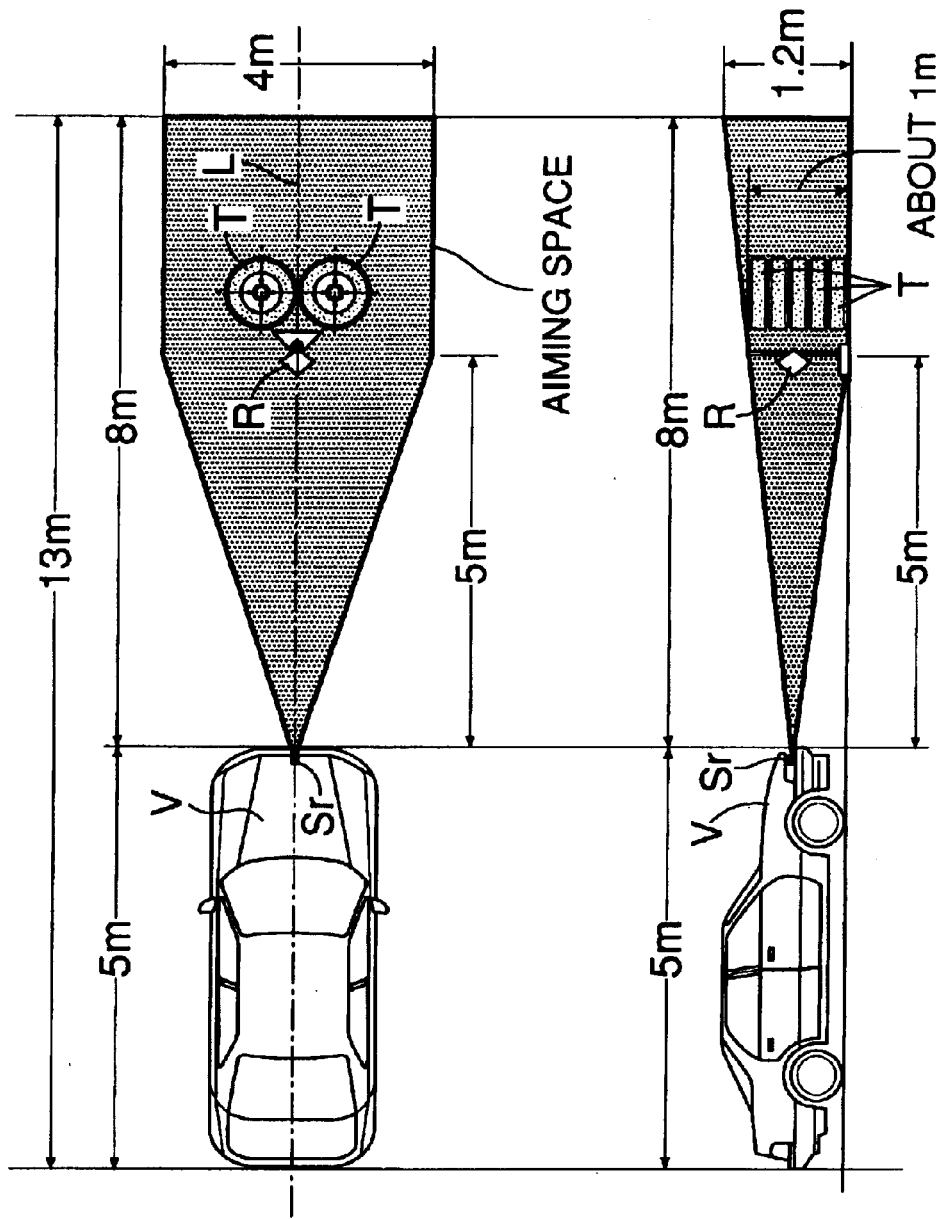
FIG. 9A is a plan view of a diagram showing a position of an aiming space according to a second embodiment of the present invention.
FIG. 9B is a side view of FIG. 9A.

In the first embodiment, the plurality of tires T are stacked to form a single column and are disposed on the centerline L of the vehicle behind the reference reflector R. However, in a second embodiment, a plurality of tires T are stacked to form two columns and placed symmetrically on opposite sides of the centerline L of the vehicle in mutually contacting states as shown in FIG. 9A. In the first embodiment, the length of the entire space required for the aiming can be decreased to 15 m from conventional 20 m, but in the second embodiment, the length can be further decreased to 13 m as shown in FIG. 9B.

Figures 10A, 10B:
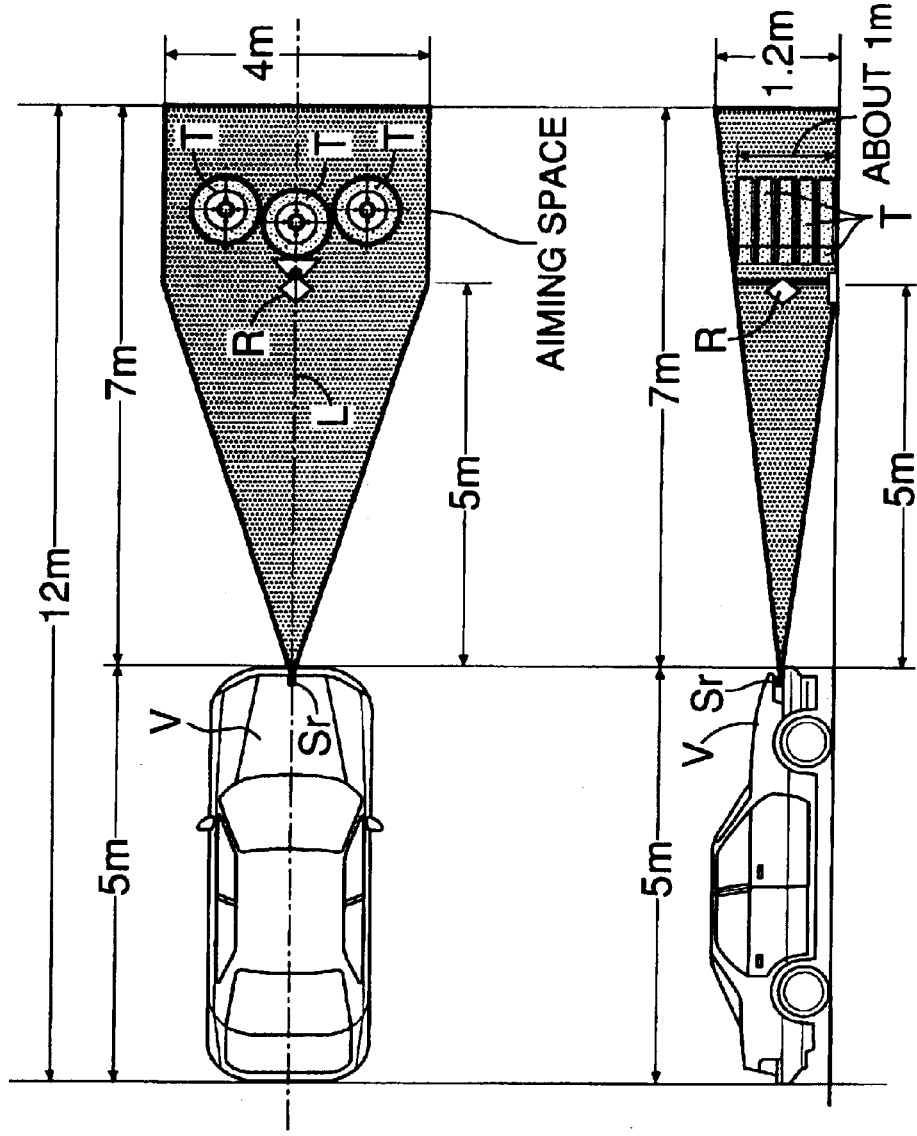
FIG. 10A is a plan view of a diagram showing a position of an aiming space according to a third embodiment of the present invention.
FIG. 10B is a side view of FIG. 10A.

As shown in FIGS. 10A and 10B, if a plurality of tires T are stacked to form three columns, placed on the centerline L of the vehicle, and symmetrically on opposite sides of the centerline L in mutually contacting states, the length of the entire space required for the aiming can be further decreased to 12 m.

In general, the electromagnetic wave absorber is classified into a resistor type and a sintered ferrite type. The resistor type is formed from a resin, such as a urethane foam or a styrol impregnated with carbon black, and the tires T in the embodiments are included in the resistor type. The electromagnetic wave absorber can have a wide-zone electromagnetic wave absorbing property by cutting the electromagnetic wave-reflecting face thereof in a pyramid shape or an angular shape to vary the apparent concentration of the carbon black and to provide an effect of scattering the electromagnetic wave. The sintered ferrite type uses a loss in magnetism of a sintered ferrite, is of a tile-shape, and is used in a state in which it is adhered to a surface of an object.

Although the embodiments of the present invention have been described in detail, it will be understood that the present invention is not limited to the above-described embodiments, and various modifications in design may be made without departing from the spirit and scope of the invention defined in the claims.

For example, the tires T have been illustrated as the electromagnetic wave absorber in the embodiments, but any electromagnetic wave absorber other than tires may be employed.

When the tires T are used as the electromagnetic wave absorber, the type of the tire T may be any of a normal tire, a studless tire, a radial tire, and a bias tire, but a spikeless tire is not suitable. A normal wheel is thinner than a tire in both cases of an aluminum wheel and an iron wheel, and hence the wheel is hidden inside the tire and cannot exert an influence to the electromagnetic wave absorbing performance. Therefore, the wheel may be mounted or not mounted to the tire.

When the reflecting face of the electromagnetic wave absorber is columnar, it suffices that at least only a side opposed to the radar system Sr is formed as a columnar face. Therefore, the tires T may be bisected to have a center angle of 180°, and stacked with columnar faces turned toward the radar system Sr. Also in this case, a similar effect can be provided.

The radar system Sr may be any of a millimeter wave radar system and a laser radar system.

Figure 11:
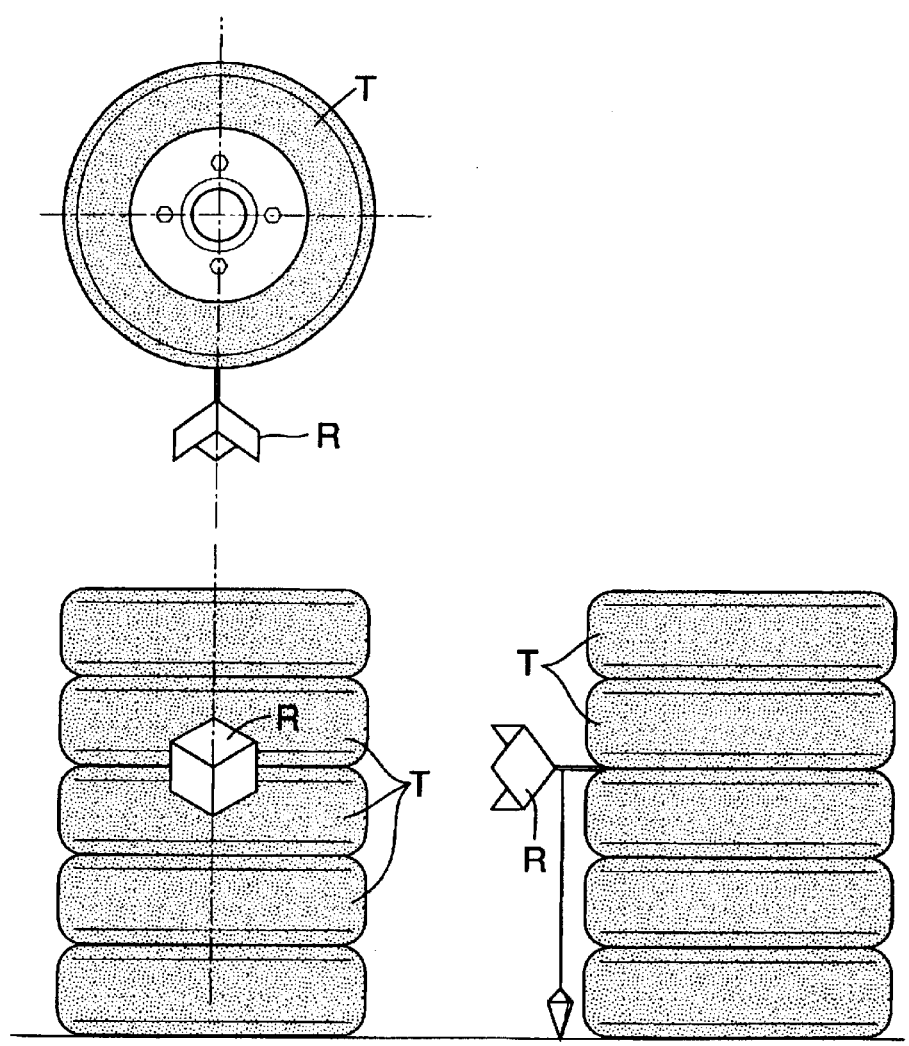
FIG. 11 is a schematic diagram showing a technique for placing a reference reflector according to a fourth embodiment of the present invention.
Figure 12:
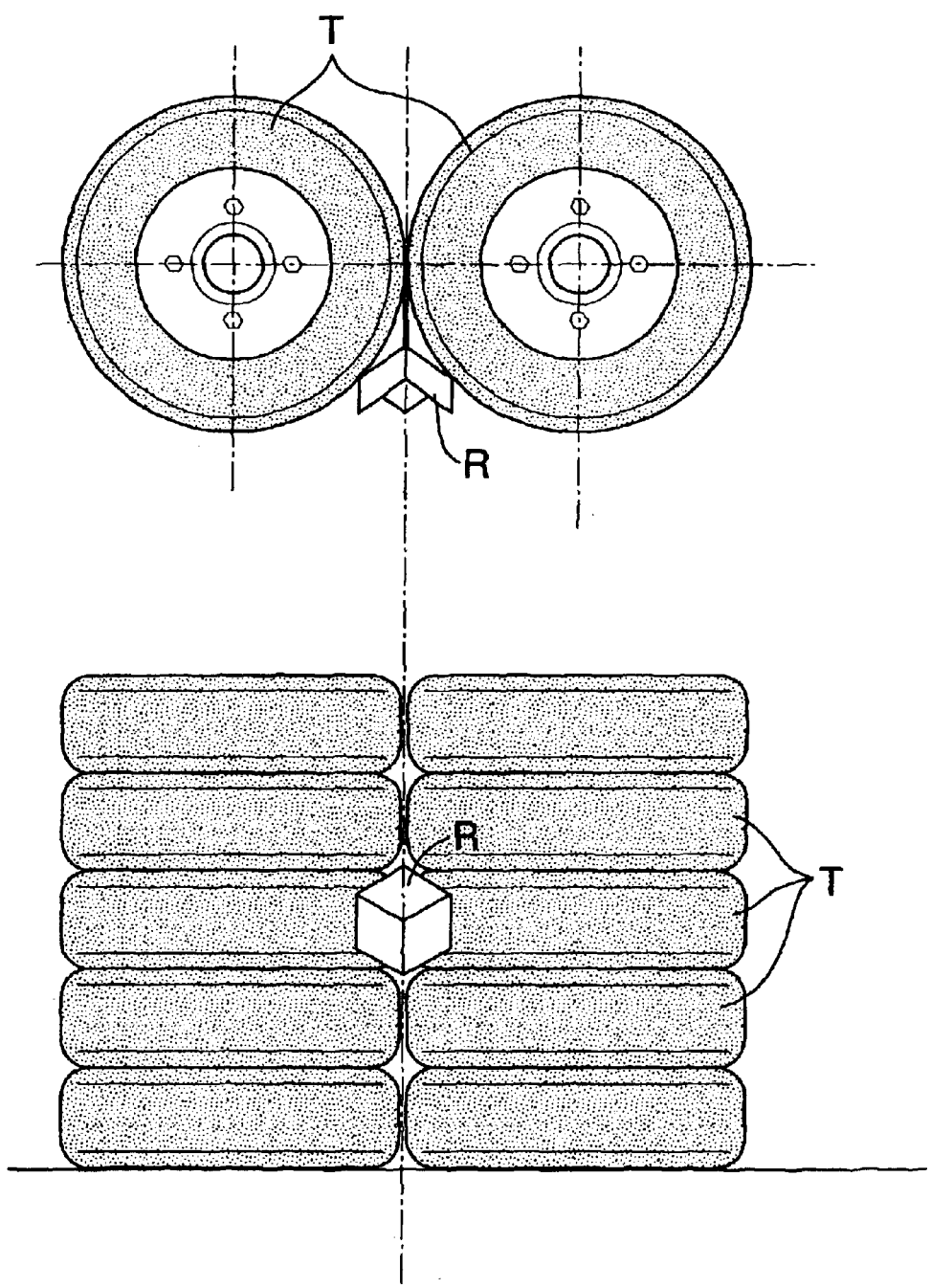
FIG. 12 is a schematic diagram showing a technique for placing a reference reflector according to a fifth embodiment of the present invention.
Figures 13A, 13B:
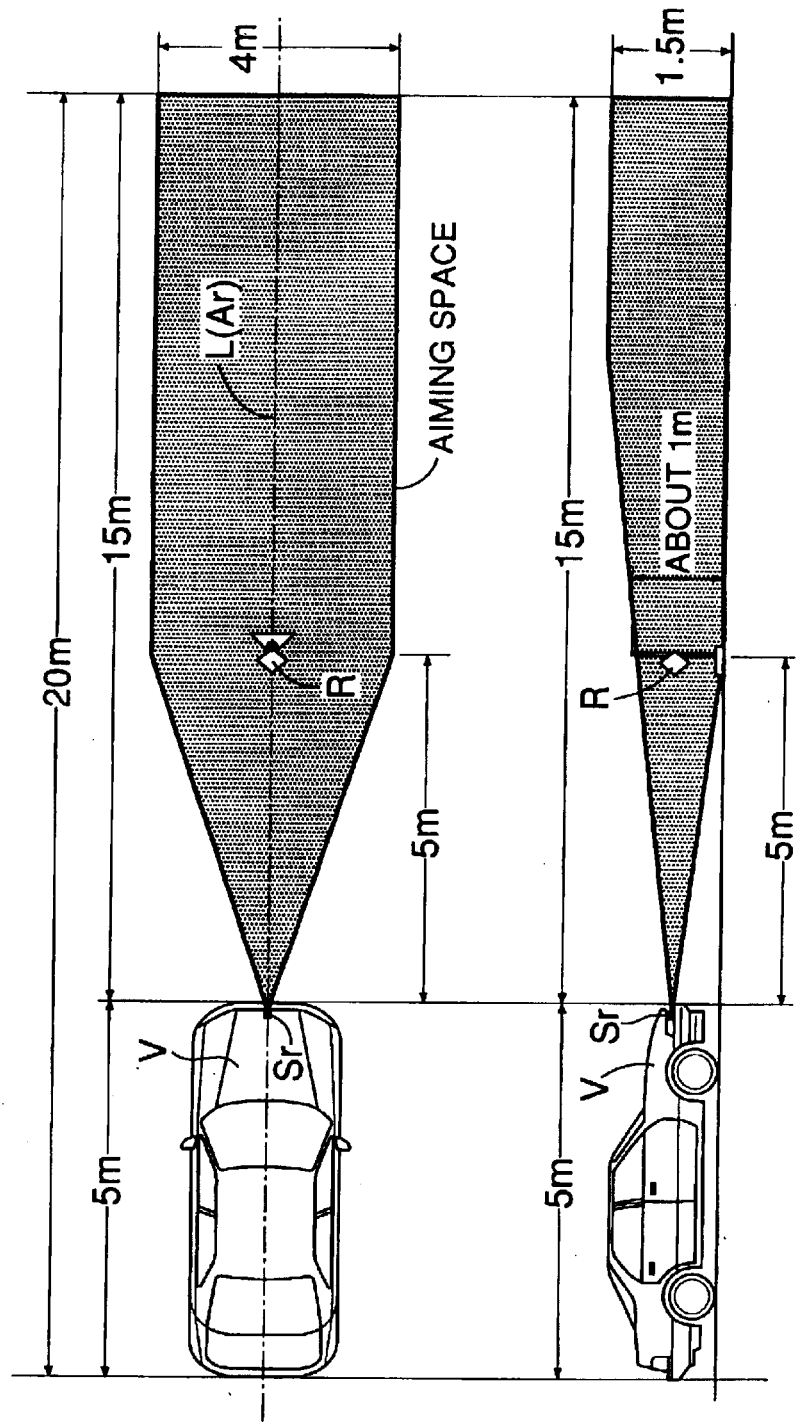
FIG. 13A is a plan view of a diagram showing a conventional position of an aiming space.
FIG. 13B is a side view of FIG. 13A.

As illustrated in a fourth embodiment shown in FIG. 11 and a fifth embodiment shown in FIG. 12, a shaft portion protruding from the reference reflector R may be clamped between the stacked tires T instead of supporting the reference reflector R through the pedestal and the support post. When the tires T are stacked in one row, the reference reflector R can be placed in a correct position by positioning a weight hung down from the shaft portion of the reference reflector R on the centerline L of the vehicle. In addition, a support portion for supporting the reference reflector R may be provided on the tire T itself.

What is claimed is:

1. A process for adjusting a detecting axis of an object detecting means to detect an object positioned in a predetermined detecting area established in a traveling direction of a vehicle by transmitting an electromagnetic wave to the detecting area and receiving a wave resulting from a reflection of the electromagnetic wave from the object, the process comprising the following steps:

a first disposing step wherein a reference reflector is disposed at a predetermined location in front of the object detecting means relative to the traveling direction of the vehicle upon which the object detecting means is mounted;

a second disposing step wherein an electromagnetic wave absorber is disposed in front of and in proximity of the reference reflector relative to the traveling direction of the vehicle and the reference reflector is positioned between the object detecting means and the electromagnetic wave absorber;

wherein the electromagnetic wave absorber has an extent including an entire projected image of the reference reflector; and an adjusting step wherein a misaligned object detecting axis of the object detecting means is adjusted in at least one of a vertical direction and a horizontal direction upon transmitting the electromagnetic wave toward the reference reflector and receipt of a wave resulting from the electromagnetic wave reflecting off the reference reflector, wherein the reference reflector assumes a reference position of the detecting area.

2. A process for adjusting a detecting axis of an object detecting means according to claim 1, wherein a face of the electromagnetic wave absorber on a side of the object detecting means is columnar.

3. A process for adjusting a detecting axis of an object detecting means according to claim 1, wherein the electromagnetic wave absorber has a height ranging over a vertical width of the detecting area in a position where the electromagnetic wave absorber is disposed.

4. A process for adjusting a detecting axis of an object detecting means according to claim 2, wherein the electromagnetic wave absorber has a height ranging over a vertical width of the detecting area in a position where the electromagnetic wave absorber is disposed.

5. A process for adjusting a detecting axis of an object detecting means according to claim 1, wherein the electromagnetic wave absorber is carbon black.

6. A process for adjusting a detecting axis of an object detecting means according to claim 2, wherein the electromagnetic wave absorber is carbon black.

7. A process for adjusting a detecting axis of an object detecting means according to claim 3, wherein the electromagnetic wave absorber is carbon black.

8. A process for adjusting a detecting axis of an object detecting means according to claim 4, wherein the electromagnetic wave absorber is carbon black.

9. A process for adjusting a detecting axis of an object detecting means according to claim 6, wherein the electromagnetic wave absorber comprises a tire.

10. A process for adjusting a detecting axis of an object detecting means according to claim 8, wherein the electromagnetic wave absorber comprises a tire.

11. A process for adjusting a detecting axis of an object detecting means to detect an object positioned in a predetermined detecting area established in a traveling direction of a vehicle by transmitting an electromagnetic wave to the detecting area and receiving a wave resulting from a reflection of the electromagnetic wave from the object, the process comprising the following steps:

a first disposing step wherein a reference reflector is disposed at a predetermined location in front of the object detecting means relative to the traveling direction of the vehicle upon which the object detecting means is mounted;

a second disposing step wherein an electromagnetic wave absorber is disposed in front of and in proximity of the reference reflector relative to the traveling direction of the vehicle and the reference reflector is positioned between the object detecting means and the electromagnetic wave absorber;

wherein the electromagnetic wave absorber has an extent including an entire projected image of the reference reflector; and an adjusting step wherein an object detecting axis of the object detecting means is adjusted by transmitting the electromagnetic wave wherein the reference reflector assumes a reference position of the detecting area;

wherein a face of the electromagnetic wave absorber on a side of the object detecting means is columnar.

12. A process for adjusting a detecting axis of an object detecting means according to claim 11, wherein the electromagnetic wave absorber has a height ranging over a vertical width of the detecting area in a position where the electromagnetic wave absorber is disposed.

13. A process for adjusting a detecting axis of an object detecting means according to claim 11, wherein the electromagnetic wave absorber is carbon black.

14. A process for adjusting a detecting axis of an object detecting means according to claim 12, wherein the electromagnetic wave absorber is carbon black.

15. A process for adjusting a detecting axis of an object detecting means according to claim 13, wherein the electromagnetic wave absorber comprises a tire.

16. A process for adjusting a detecting axis of an object detecting means according to claim 14, wherein the electromagnetic wave absorber comprises a tire.

17. A process for adjusting a detecting axis of an object detecting means to detect an object positioned in a predetermined detecting area established in a traveling direction of a vehicle by transmitting an electromagnetic wave to the detecting area and receiving a wave resulting from a reflection of the electromagnetic wave from the object, the process comprising the following steps:

a first disposing step wherein a reference reflector is disposed at a predetermined location in front of the object detecting means relative to the traveling direction of the vehicle upon which the object detecting means is mounted;

a second disposing step wherein an electromagnetic wave absorber is disposed in front of and in proximity of the reference reflector relative to the traveling direction of the vehicle and the reference reflector is positioned between the object detecting means and the electromagnetic wave absorber;

wherein the electromagnetic wave absorber has an extent including an entire projected image of the reference reflector; and an adjusting step wherein an object detecting axis of the object detecting means is adjusted by transmitting the electromagnetic wave wherein the reference reflector assumes a reference position of the detecting area;

wherein the electromagnetic wave absorber is formed to make zero a transmitted component of the electromagnetic wave transmitted through the electromagnetic wave absorber and to reduce a reflected component of the electromagnetic wave reflected from the electromagnetic wave absorber largely such that the object detecting means can precisely detect the wave resulting from the reflection of the electromagnetic wave from the object.

18. A process for adjusting a detecting axis of an object detecting means to detect an object positioned in a predetermined detecting area established in a traveling direction of a vehicle by transmitting an electromagnetic wave to the detecting area and receiving a wave resulting from a reflection of the electromagnetic wave from the object, the process comprising the following steps:

a first disposing step wherein a reference reflector is disposed at a predetermined location in front of the object detecting means relative to the traveling direction of the vehicle upon which the object detecting means is mounted;

a second disposing step wherein an electromagnetic wave absorber is disposed in front of and in proximity of the reference reflector relative to the traveling direction of the vehicle and the reference reflector is positioned between the object detecting means and the electromagnetic wave absorber;

wherein the electromagnetic wave absorber has an extent including an entire projected image of the reference reflector; and an adjusting step wherein an object detecting axis of the object detecting means is adjusted by transmitting the electromagnetic wave wherein the reference reflector assumes a reference position of the detecting area;

wherein the electromagnetic wave absorber has a height ranging over a vertical width of the detecting area in a position where the electromagnetic wave absorber is disposed.

19. The process according to claim 18, wherein the electromagnetic wave absorber is carbon black.

* * * * *